United States Patent [19]

Thingvold

[11] Patent Number: 5,852,450
[45] Date of Patent: Dec. 22, 1998

[54] METHOD AND APPARATUS FOR PROCESSING CAPTURED MOTION DATA

[75] Inventor: Jeffrey Allyn Thingvold, Shoreview, Minn.

[73] Assignee: Lamb & Company, Inc., Minneapolis, Minn.

[21] Appl. No.: 678,670

[22] Filed: Jul. 11, 1996

[51] Int. Cl.$^6$ ................................................. G06T 17/70
[52] U.S. Cl. ........................................... 345/473; 345/328
[58] Field of Search ..................................... 395/173, 174, 395/613, 952, 953; 345/473, 474, 302, 328; 707/102

[56] References Cited

U.S. PATENT DOCUMENTS

| | | | |
|---|---|---|---|
| 5,214,758 | 5/1993 | Ohba et al. ............................ | 395/173 |
| 5,267,154 | 11/1993 | Takeuchi et al. .................... | 364/419.2 |
| 5,623,428 | 4/1997 | Kunii et al. ........................... | 395/173 |

OTHER PUBLICATIONS

AniLan–an animation language, Computer Animation '96, pp. 184–189, Formella et al., IEEE Computer Society Press, Jun. 1996.

Modeling and Animating Three–Dimensional Articulate Figures, Graphics Interface '86 Vision Interface '86, Cachola et al., pp. 152–157, May 1986.

Interactive Animation: A Language and System for Procedural Modeling and Motion, IEEE Computer Graphics and Applications Magazine, Green et al., vol. 8, Issue 6, pp. 52–64, Nov. 1988.

A Technique for Animating Natural Behavior in Complex Scenes, IEEE, Sun et al., pp. 1271–1277, Aug. 1991.

*Primary Examiner*—Stephen S. Hong
*Attorney, Agent, or Firm*—Schwegman, Lundberg, Woessner & Kluth, P.A,

[57] ABSTRACT

A motion data processing system employs an interface and database created in a computer's memory. The database provides consistent, concurrent motion data, allowing the user to minimize the number and type of additional data files that must be maintained. The system provides a common interface, enabling different views of the motion data in the database according to the application module executed by a user. The system also provides a transformer for efficiently applying motion data with a particular hierarchy to geometry data with a different hierarchy.

1 Claim, 12 Drawing Sheets

```
/* TAG( Lscmp_scene_element )
 * An element of a scene.  Base class for others like cameras, geometry objects, lights,
 * and dummy objects.*/ class Lscmp_scene_element {
        friend class Lscmp_scene;
        friend class Lscmp_shot;
        friend class Lscmp_show;
        friend class Lscmp_show_element;
        friend int Lscmp_init_library();
protected:

int              at_me;                      // reference count
        Lscmp_identifier ident;
        Lscmp_scene      *in_scene;                  // what scene I am a part of
        int              obj_number;                 // unique object number
        int              version;                    // how many copies this is
        int              lod;                        // level of detail
        int              projection;                 // 1=persp, 0=ortho
        int              layer;                      // layer number
        int              begin_file_number;
        int              end_file_number;
        int              obj_color;                  // object color
        float            ortho_scale;                // scale of ortho proj
        float            ambient;                    // ambient light level
        se_type          type;                       // camera, geom, light, etc.
        L_NI_LIST        *channels;                  // trans info (Lscmp_channel *)
        L_NI_str_list    *excl_list;                 // exclusion list (char *)
        char             format;
        char             rot_priority[4];            // rotation priority
        char             tran_priority[4];           // transformation priority
        char             group_name[20];             // group name
        char             alias[LSCMP_IDENT_LEN];     // application specific
        char             parent[LSCMP_IDENT_LEN];    // parent's name
        int              print_flag;                 // 1=print me, 0=don't print me
        char             *filename;                  // .obj, .lgt, etc...
        char             *sfilename;                 // secondary reference
        float            shlub_level;                // lower res data level
        char             *shlub_file;                // lower res data file
        float            int_matrix[4][4];           // store an intial matrix

```
/* TAG( Lscmp_se_camera)
 * A camera scene element.*/ class Lscmp_se_camera: public Lscmp_scene_element {
 private:

// Too complex to inline, a regular method.
void reset();

// Hide the destructor so the user must use unref().
~Lscmp_se_camera();

int     aperture;       // type of aperture (flag)
    float   aper_width;     // aperture width
    float   hither;         // hither plane
    float   yon;            // yon plane
    float   focal_len;      // focal length
    float   aspect;         // aspect ratio
    float   viewport[4];

public:

// Basic constructor
Lscmp_se_camera (const char *s, Lscmp_scene *scene = NULL) :
Lscmp_scene_element
        {reset(); };

// Copy constructor
Lscmp_se_camera (Lscmp_se_camera *);
Lscmp_se_camera (Lscmp_scene_element *);

// Virtual Constructor
Lscmp_scene_element *new_scene_element ();

//Deep copy virtual constructor
Lscmp_scene_element *copy_scene_element ();

```
/* TAG( Lscmp_se_bone)
 * A bone scene element.*/ class Lscmp_se_bone: public Lscmp_scene_element {
private:

float       length;
    float       radius;
    int         root;              // root bones are special. 1 if so.
    int         shape;             // cross section. 0=tri, 1=sq, 2=circ
    char        axis_order[4];     // length, VUP, alt-VUP
    int         center;            // -1=Neg axis, 0=Centered, 1=Pos axis
//
// Connected to another scene element.
// If this is used, then the length value is not used.
//
    char        *connect;
    xyz_td      connect_offset;

// Hide the destructor so the user must use unref ().
~Lscmp_se_bone();

// Too complex to inline, a regular method.
void reset();

public:

// Basic constructor
Lscmp_se_bone (const char *s, Lscmp_scene *scene = NULL):

// Copy constructor
Lscmp_se_bone (Lscmp_se_camera *);
Lscmp_se_bone (Lscmp_scene_element *);

// Virtual Constructor
Lscmp_scene_element *new_scene_element ();

//Deep copy virtual constructor
Lscmp_scene_element *copy_scene_element ();

METHOD AND APPARATUS FOR PROCESSING CAPTURED MOTION DATA

FIELD OF THE INVENTION

The present invention relates in general to methods and apparatus for animation processing, and particularly to processing captured motion data and integrating object structure and motion characteristics.

BACKGROUND OF THE INVENTION

Three-dimensional computer animation has two primary elements—one or more objects with some type of form or structure, and motion data to define the motion of the objects within a scene. Each object is described in terms of a geometry around a set of elements or segments. The segments serve as the object's skeleton, giving the object a basic framework. The geometry is related to the framework and defines the object's physical characteristics, such as size and shape. Each segment in an object is related to other segments in the object in terms of rotation, scale, and translation. An object "moves" because the relationships between the segments change over time. Animation data describes these changes.

One method of generating motion data is known as motion capture, and essentially consists of measuring the changing relationships between a set of data points on a "live" subject while that subject moves. The set of data points is arranged in a pattern which represents the framework of the object whose motion is to be recorded. Conventional motion capture systems collect motion information and then generate the character from the structural information implicit in the captured data. This process limits the motion hierarchy, and thus the character or object which is being animated, to that embedded in the motion capture data. Another method of creating three-dimensional animated images is to create the character motion hierarchy first and then manufacture motion data for that character. This allows the user to create whatever scene character they want, but has the disadvantage of the user having to manufacture all of the motion data. There is presently no convenient method for applying motion capture data to a separately-designed character. What is needed is a way to correlate motion capture data with scene character structure information such that the user has the freedom to create the character they want and then animate the character with motion capture data.

Once motion data is collected, whether the data be manufactured or captured, it must be processed. Conventional systems comprise a series of independent applications which address only certain aspects of the animation generation process. A user must run one application to view the object in motion, another application to edit the motion capture data, and yet another to render the data. Each application has its own set of files related to processing the motion data. As a result, many files need to be coordinated to ensure an accurate result. This requires a large amount of reading and writing to the disks which adds time and increases the chance for introducing errors into the data. What is needed is an integrated system for performing all of the tasks involved in processing motion data. Towards that end, a more efficient and accurate means of sharing motion data is also needed.

SUMMARY OF THE INVENTION

One embodiment of the invention comprises a method for managing animation data implemented on a computer system with a memory and a display. The animation data includes geometry data describing various elements in a scene, and motion data describing how the scene elements move. The geometry data comprises a hierarchy of segments and nodes, with nodes defining a connection between two or more segments. Similarly, the motion data also comprises a hierarchy of segments and nodes. One step in the method of the embodiment stores the motion data in a database resident in the computer's memory. A second step in the method stores the geometry data in a computer-readable file. The motion data is then edited using a graphical user interface to adjust various motion and geometry components of the scene. The resulting edited motion data and geometry data are then combined to create a computer-readable file of three-dimensional animation data. An additional step in the method transforms the motion data hierarchy and aligns it with the geometry data hierarchy. Further steps are executed which comprise creating a transformation for each node in the geometry data hierarchy. The transformation for each node is then stored in the database. A final step in the method then applies the motion data to the geometry data by transforming each node of the motion data hierarchy according to the respective transformation stored in the database.

BRIEF DESCRIPTION OF THE DRAWINGS

FIG. 4A is an example of the data elements which comprise base a class used to define LSCMP database objects according to one embodiment of the present invention.

FIG. 4B is an example of the structure for a camera object residing in the LSCMP database according to one embodiment of the present invention.

FIG. 4C is an example of the structure for a bone object residing in the LSCMP database according to one embodiment of the present invention.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

The system of the invention executes in a computer environment which supports graphics processing. One example of such an environment is a Silicon Graphics® Inc. workstation such as an Indigo Extreme™. A preferred configuration includes 32 Mbytes of main memory and a 100 MHz processor. The system also includes a monitor which supports graphic displays. Version 5.2 of the IRIX™ is the preferred operating system. Those skilled in the art will recognize, however, that other comparable hardware and operating systems may be employed without diverting from the spirit or scope of the present invention.

Figure 1:
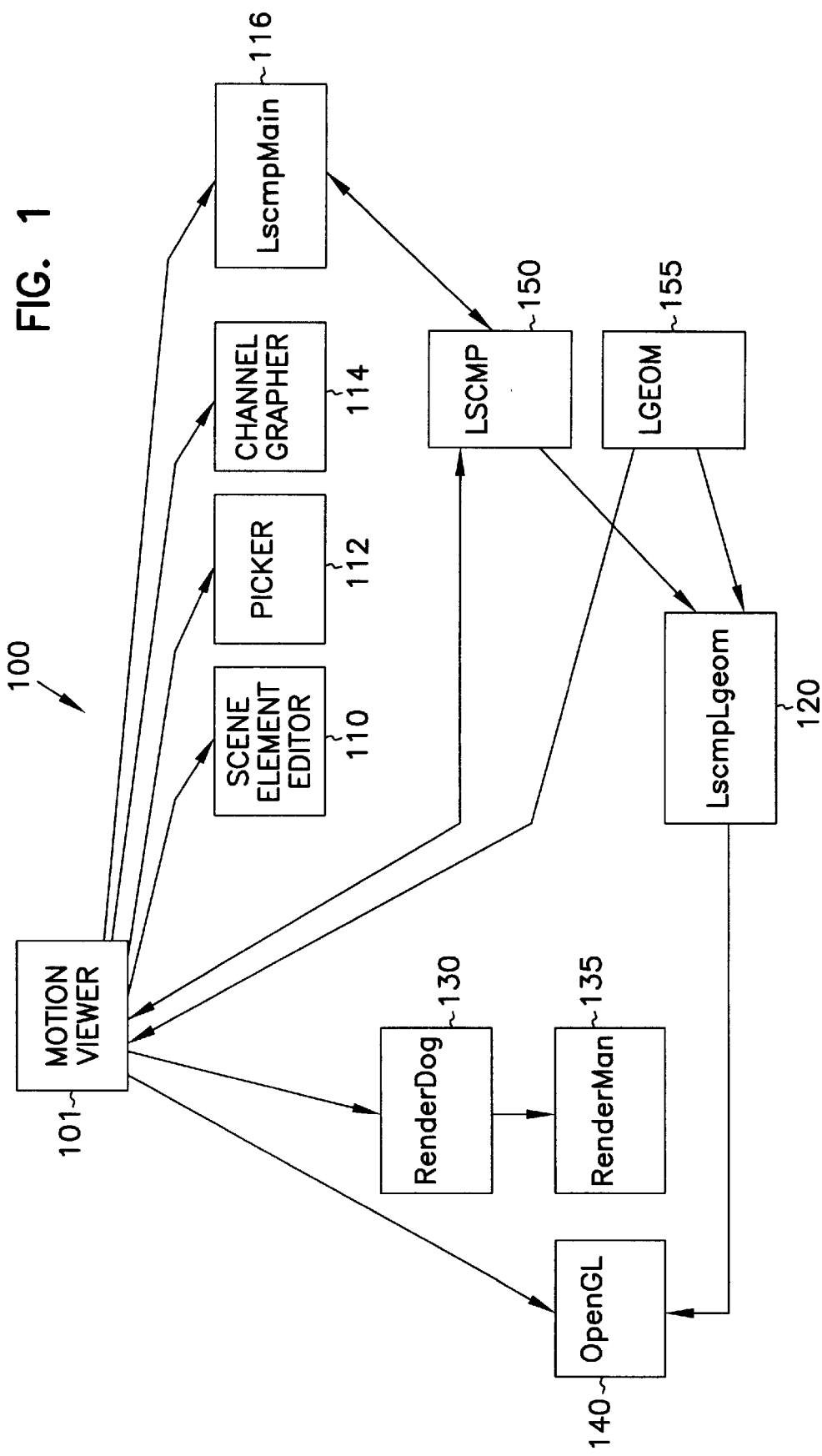
FIG. 1 is a block diagram showing major elements of one implementation of the present invention.

FIG. 1 shows a logical hierarchy 100 of elements according to one embodiment of the three-dimensional animation processing system of the present invention. The present invention incorporates heretofore independently executed motion data processing tasks into a single interface. The system of the invention employs the Lamb Scene Composition (LSCMP) database 150 as a central data store. The database 150 is constructed in the computer's memory and thus is able to provide a consistent concurrent view of motion data to all of the application modules in the motion data processing system without having to resort to the inefficient process of writing to and reading from a series of data files. Conventional systems must maintain one or more files for each aspect of motion data processing (such as editing scene elements, modifying a scene, or rendering a scene). This adds to the time required for processing and to the user's burden of having to keep all of the files straight in terms of which files have to be coordinated with which other files. Such files must be coordinated both according to the data they contain as well as the concurrency of the data they contain. The system of the present invention simplifies the processing and coordinates the data within the database 150 so the user does not have to do it manually.

The present invention also employs a specialized LSCMP language for coordinating the processing of the individual application modules and the database. The LSCMP language, available as part of the "MoveTools" software package and as described in publications available from LambSoft Inc., Minneapolis, Minn., allows the system of the invention to efficiently interface between the various application modules 100 and create and manage the LSCMP database in the computer's memory.

Figure 3:
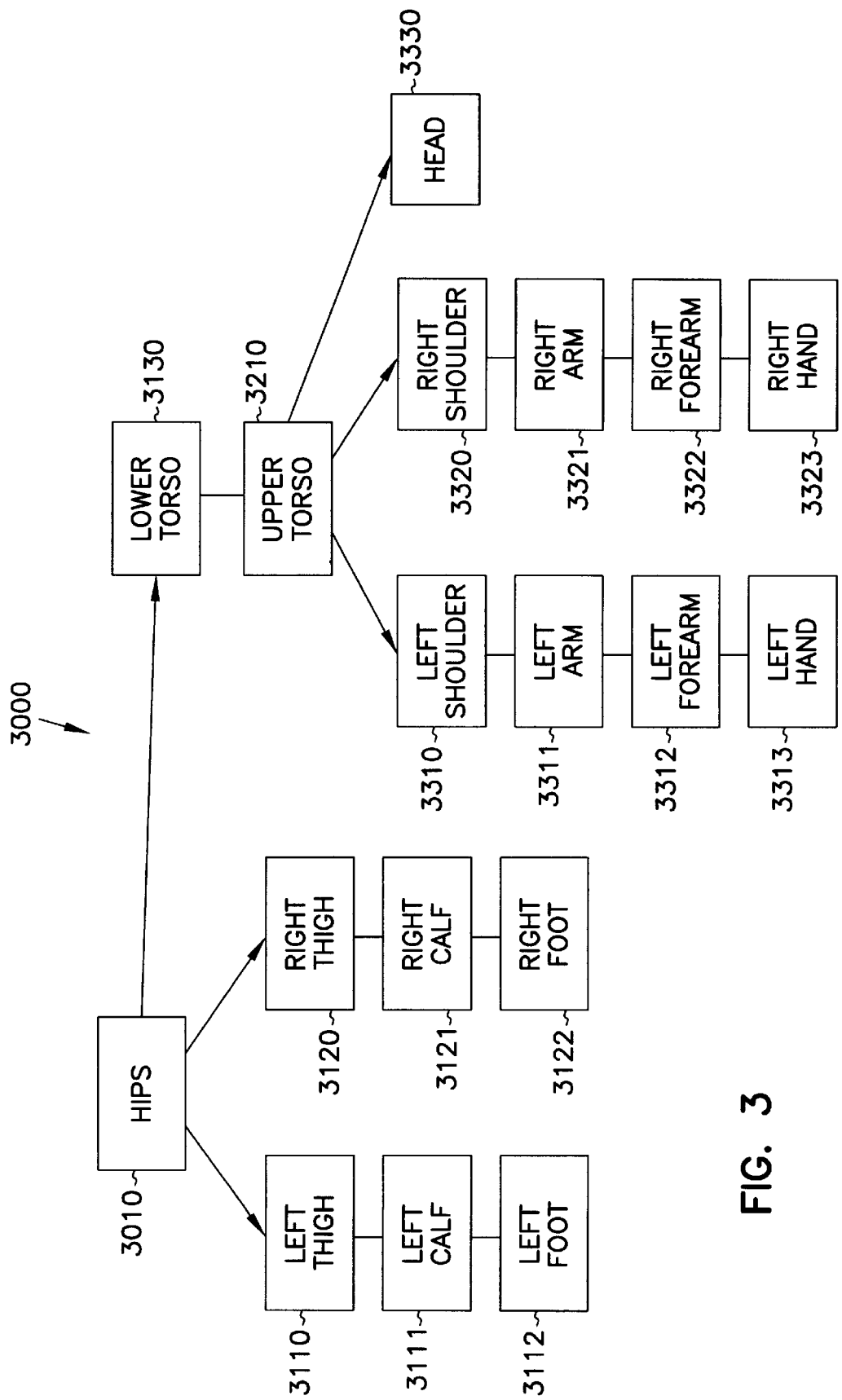
FIG. 3 is a schematic diagram illustrating a motion capture structure hierarchy.

The LSCMP database 150, created in the computer's memory, stores three-dimensional animation data. References to underlying object geometry is stored in an external file. The database is independent of application-specific display mechanisms, so a variety of applications may be employed to edit or view the animation data. Motion capture data is essentially a recording of the changing relationship between a series of data points over time, the series of data points providing the underlying motion hierarchy. FIG. 3, described in more detail below, shows a representation of the motion hierarchy implicit in a set of motion capture data for a human figure.

Figure 2:
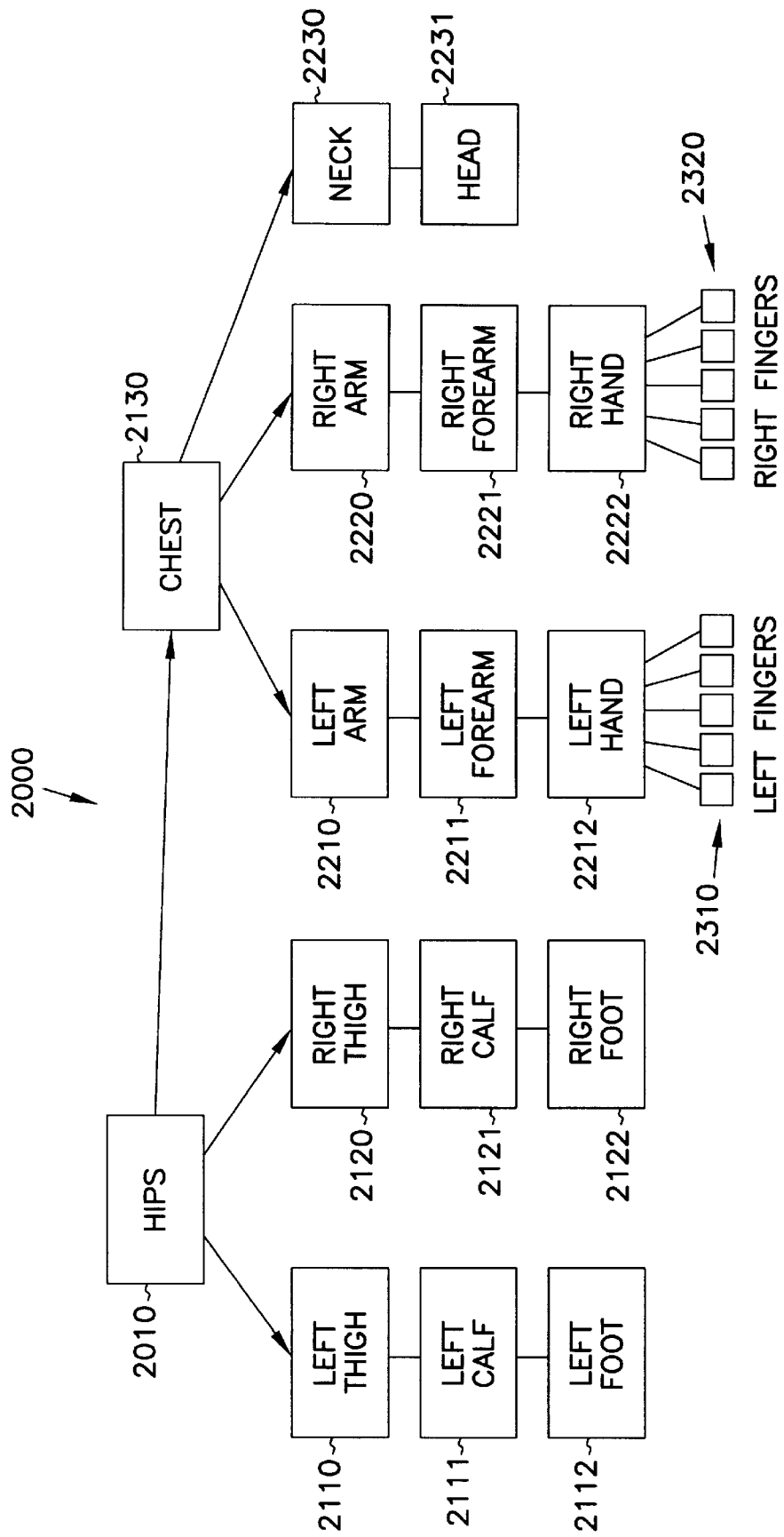
FIG. 2 is a schematic diagram illustrating a character motion structure hierarchy.

The three-dimensional scene character is created by an application such as Kinemation™ as a geometry embodying a set of segments. Data describing the surface and structure of the scene character's segments and geometry is stored in the geometry file Lgeom 155. The connection point between two segments is a referred to as a joint or node. A character's motility is described based on a character motion hierarchy, which can be represented in an inverted tree structure. One example of a character motion hierarchy, for a human figure, is shown in FIG. 2. In the example shown, the "root" of the "tree" is the hips segment 2010. The hips segment 2010 is the parent of the left thigh segment 2110, right thigh segment 2210, and chest segment 2130. Each thigh segment 2110, 2210 is the parent of a calf segment 2111, 2121, each of which is the parent of a foot segment 2112, 2122. The chest segment 2130 is the parent of the left arm segment 2210, right arm segment 2220, and neck segment 2230. Each arm segment 2210, 2220 is the parent of a forearm segment 2211, 2221, each of which is the parent of a hand segment 2212, 2222, each hand segment being a parent of a set of finger segments 2310, 2320. The neck segment 2230 is the parent of the head segment 2231. There is no bounded set of character motion hierarchies. Each character motion hierarchy is developed in such a way as to best represent the character's structure and range of motion.

Motion data associated with a particular scene is stored in the LSCMP database 150 in the computer's memory. The database 150 comprises a series of objects, each describing an element of the scene. Each object contains the same set of base items, as shown in FIG. 4A. Additional items that are relevant only to the particular source element being described by that object are included in each object. FIG. 4B shows the structure for a camera object and FIG. 4C shows the structure for a bone object. Objects may be created for any scene element. It is to be recognized that the referenced figures and descriptions are intended only as examples and are in no way meant to limit the scope of the present invention.

LSCMP database 150 is created in memory each time a scene is initiated. New elements within a scene are created using Scene Element editor 110. The database objects are displayed by a variety of application modules. Each application module chooses how it wishes to display LSCMP data. The application module is responsible for converting the LSCMP data into graphics commands for creating a visual representation of the animation data.

MotionViewer 101 (FIG. 1) creates an interactive visual work space, integrating the other individual application modules into a single user interface for editing the motion data held in the LSCMP database. It also serves as a graphical interface for interactively displaying the motion data in a three-dimensional scene. Each scene may have more than one element (such as character or an object). Scene Element Editor 110 allows the user to view and edit motion data associated with a single scene element in the LSCMP database 150. Picker 112 presents the motion data as a list from which the user selects some aspect of a scene element or channels of time-varying data associated with a scene element for viewing or editing. The motion aspects of a scene element are represented by time varying data stored in channels. A channel is essentially an array of time-variant data, such as the twisting of some part of the character or object. Channel Grapher 114 presents a two-dimensional graphical view for viewing and editing channel data stored in LSCMP 150. LSCMP Main 116 is a command line interface, through which a user views and edits motion data with text commands.

In the same way, motion capture data reflects a hierarchy of inter-related segments. Such a motion capture hierarchy can be represented by a tree structure as well. In the example shown in FIG. 3, the root node 3010 of the motion capture motion hierarchy 3000 is the hips. The hips node 3010 is the parent of the left thigh 3110, right thigh 3120, and lower torso 3130 segments. The respective thigh segments 3110, 3120, are the parents of calf segments 3111, 3121, which are in turn the parents of left and right foot segments 3112, 3122. Lower torso segment 3130 is the parent of the upper torso segment 3210, which is the parent of the left and right shoulder segments 3310, 3320 and head segment 3330. The left and right arm and hand segments 3311–3313, 3321–3323 complete the hierarchy.

LSCMPLgeom 120 (FIG. 1) is a library of procedures, desirably written in the LSCMP language. These procedures are called by a rendering interface (such as RenderDog™ 130 or OpenGL™ 140). The procedures in LSCMPLgeom locate the geometry information stored in Lgeom 155, and the associated motion data (the time-varying changes to the geometry), stored in the LSCMP database 150. LSCMPLgeom 120 procedures then apply the motion data to the geometry information and pass the results, in the example shown, to RenderDog™ 130 or OpenGL™. LSCMPLgeom 120 stores the modified geometry data in an object in the LSCMP database in the computer's memory, and the objects can then be displayed by RenderDog 130 and the MotionViewer 101. RenderDog 130 provides a mechanism for incorporating the LSCMPLgeom results into a realistic three-dimensional image file rendered through Pixar's® RenderMan™ interface 135. Alternatively, MotionViewer 101 displays an interactive three-dimensional scene, rendering the image using the Silicon Graphics, Inc. (SGI) OpenGL™ programming interface 140, which is less detailed than that provided by RenderMan™. The MotionViewer 101 display, however, since it is interactive, allows changes in the data to be viewed immediately in the MotionViewer 101 and the user does not have to repeat the rendering step. This allows the user to be more efficient, quickly viewing changes in one window while editing the same data in another window. In contrast, conventional systems do not support running different motion data processing applications concurrently against the same data.

Each individual segment of the character, whether it be represented by a character motion hierarchy or motion capture hierarchy, exists in a local coordinate system which is oriented to that segment alone. To represent the character as a single entity the position and alignment of each segment of the character's hierarchy must be oriented to a single global coordinate system. This can be accomplished in several ways. One is to convert each local coordinate system directly to the global coordinate system. This method, however, masks the interrelationship of the segments. A second method is to orient a single central segment, the root of the tree, to the global coordinate system and then correlate the remaining segments by associating each segment with its adjoining segments. Segments are associated by converting the local coordinate system each child segment to the local coordinate system of their respective parent segment.

A transformation is a mathematical description of this change from one coordinate system to another. Each node of the character motion hierarchy tree represents a transformation from the local coordinate system of one segment to the local coordinate system of the adjacent segment. A transformation is defined in terms of operations such as rotation, translation, and scaling. Each transformation occurs in its own reference frame or context. A transformation is "local" when its reference frame is relative to the transformation of its parent node. A "global" transformation is one where its reference frame is relative to the world coordinate system. Inner nodes of the character motion hierarchy are thus local transformations when considered individually. The root of the hierarchy is always global because it has no parent, but rather identifies the character in terms of the world coordinate system. A global transformation can be generated for any given node by concatenating the local transformation of that node with the local transformation of its parent, then concatenating the result with the local transformation of its parent's parent, and so on, until the root node is reached and its transformation (which is always global by definition) is concatenated.

To represent motion of the character, the transformation at each node changes over time. Character motion data describes how the segments can move in relation to each other and the whole character. Motion capture data describes the actual movement of segments. The movement of any one segment can be described by a series of changes in the time-varying data which defines the segment's translation, rotation, and scaling. This motion data is stored in the database along with references to the file containing the generic data. FIGS. 2 and 3 illustrate how the motion hierarchy of motion capture data uses different reference frames than those of the character motion hierarchy to which the motion capture data is to be applied. The structure of the motion capture hierarchy and the structure of motion hierarchy of the scene character to which the motion capture data is to be applied are typically not the same. As a result, the motion capture data must be transformed. Conventional methods of transforming motion capture data are difficult to employ and quite inefficient. An embodiment of the invention provides an interactive method for transforming motion capture data which is much more intuitive for the user and more efficient in terms of resource usage. The Angles Only mode of the MotionViewer 101 provides the graphic interface which simplifies the process of correlating motion capture data to a previously defined three-dimensional character.

In the following example the motion capture data is EVa htr data, and Kinemation® is the software in which scene elements are originally created. EVa is a motion file format developed by Motion Analysis Corporation®. Kinemation® is a commercial animation package created by Alias WaveFront®. One skilled in the art will, however, recognize that other motion capture data files and animation software may be used, and that EVa and Kinemation® are specified only to simplify and illustrate the transformation process.

Figure 5:
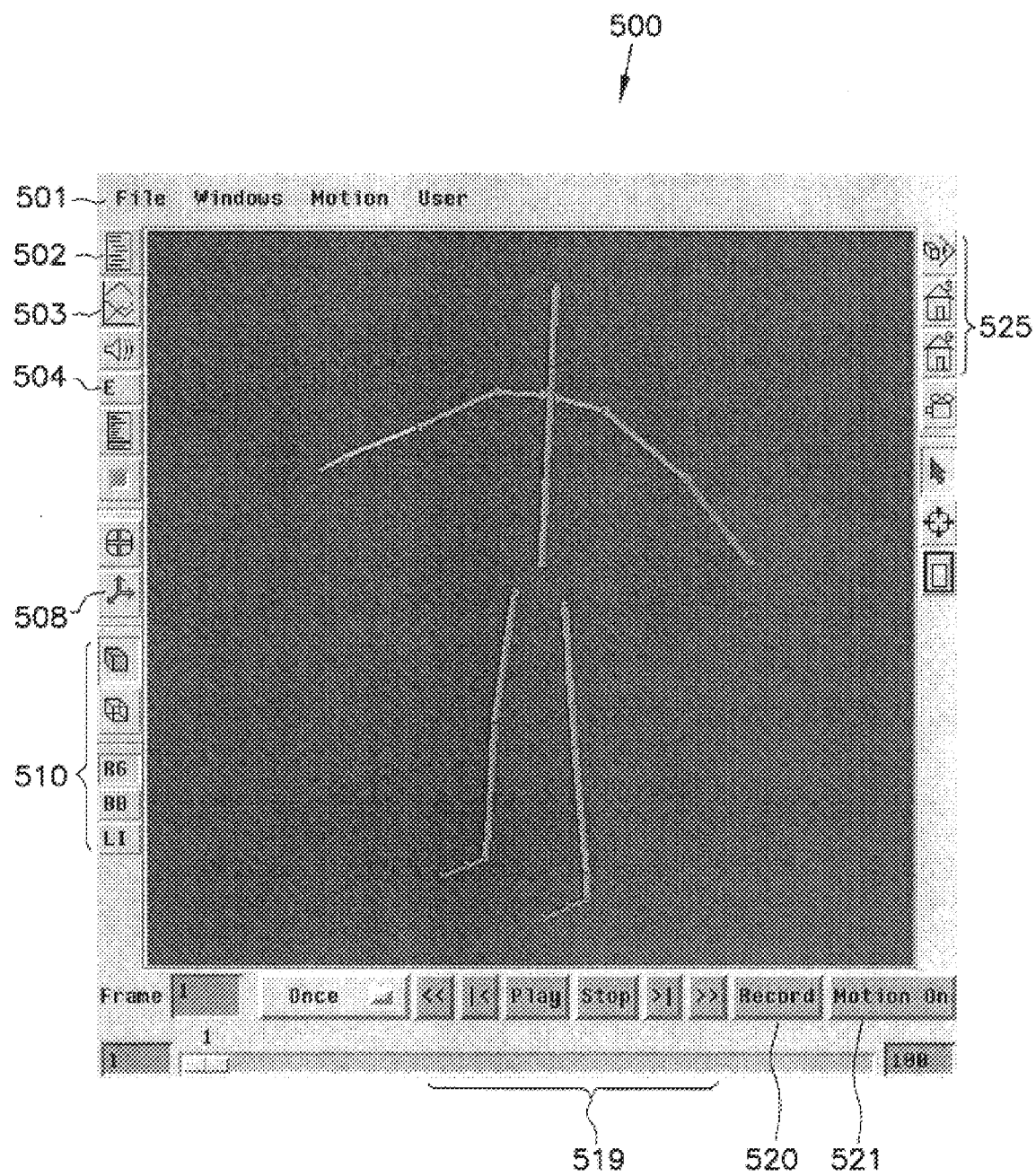
FIG. 5 is an example of a MotionViewer display of a scene character.

FIG. 5 shows a representation of the MotionViewer main window 500. The window comprises a menu bar 501 and a number of toggle buttons which provide a short-cut to menu options. The message window, which is one means used by the user for interacting with the computer, is activated by selecting the message button 502. Other buttons activate processing options such as the channel grapher 503, scene element editor 504, and angles only 508. "Motion on" 521 reviews the result of applying motion capture data to a character. Display control buttons 519 allow the user to play, rewind, fast forward, move frame-by-frame through, or stop the motion display. Other buttons provide shortcuts for executing standard animation processing such as positioning the camera 525 and controlling the figure structure representations 510.

Figure 6:
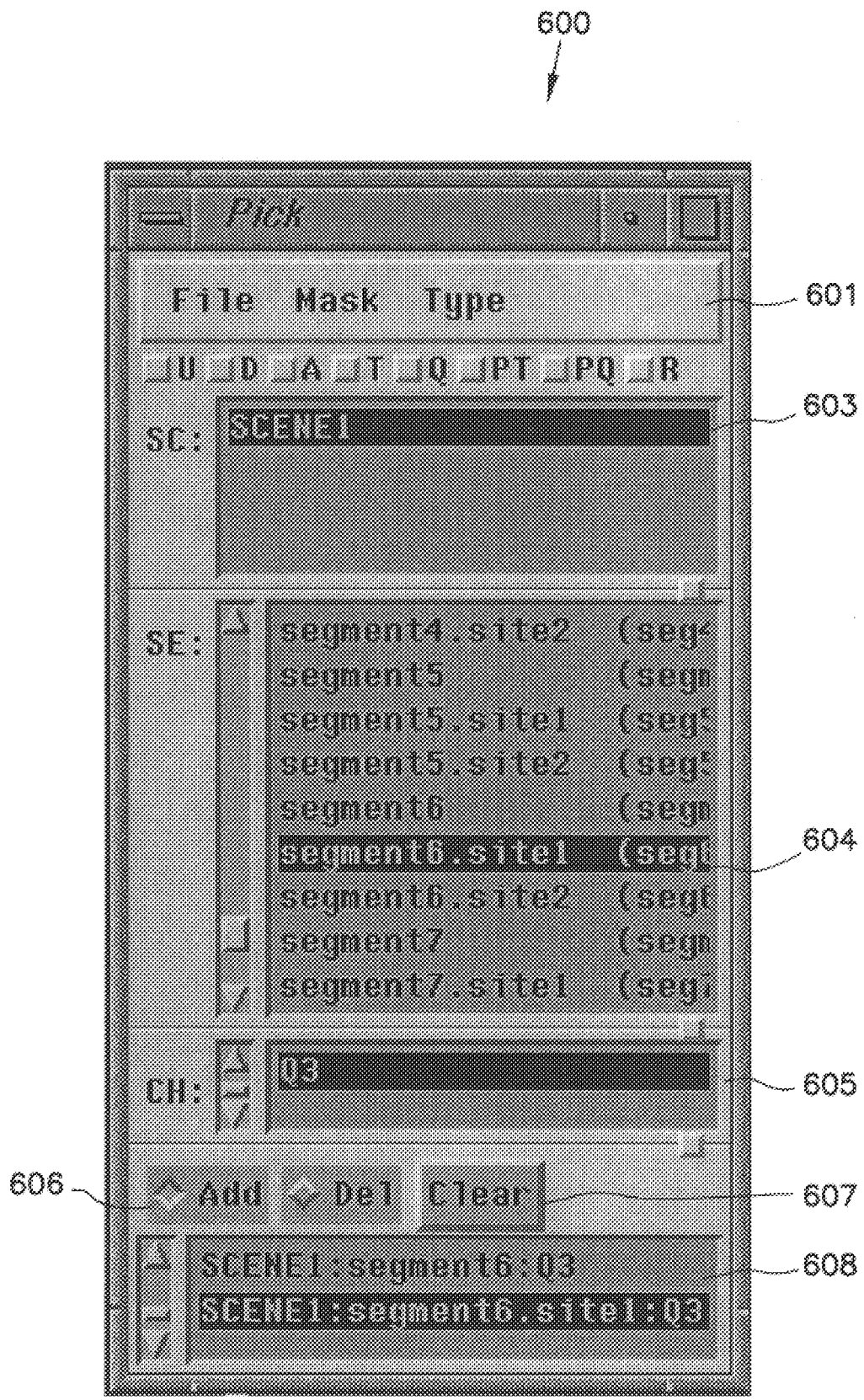
FIG. 6 is an example of the window presented by the Picker application.

The first step of the transformation process is to read the geometry information into an animation development application such as Kinemation®. This creates a character motion data file in Kinemation® format. The user then opens the Preferences dialog and toggles the Show Bones flag on in order to display the object's skeleton, reading the data into the system of the invention from the Kinemation®-format file, on the MotionViewer window 500. The scene element names for both segments and sites associated with the skeleton being shown in the MotionViewer window 500 are listed in the Picker window 600, an example of which is shown in FIG. 6. Menu bar 601 employs conventional pull-down windows to provide menu options for file and display options. Scene field 603 displays the identifier of the currently displayed scene. The user may switch scenes by keying in the identifier of the scene to be displayed. Segment field 604 displays the identifier for the currently selected segment and any associated sites. The highlighted segment or site is the one that is 'active' and to which any modifications will apply. The channel window 605 lists the identifiers of all channels associated with the highlighted segment or site 604. Entity field 608 lists the fully-qualified entity name for each of the channels. Button bar 606 allows the user to add, delete, or reset whichever channel is currently selected in the entity field 608.

Figure 7:
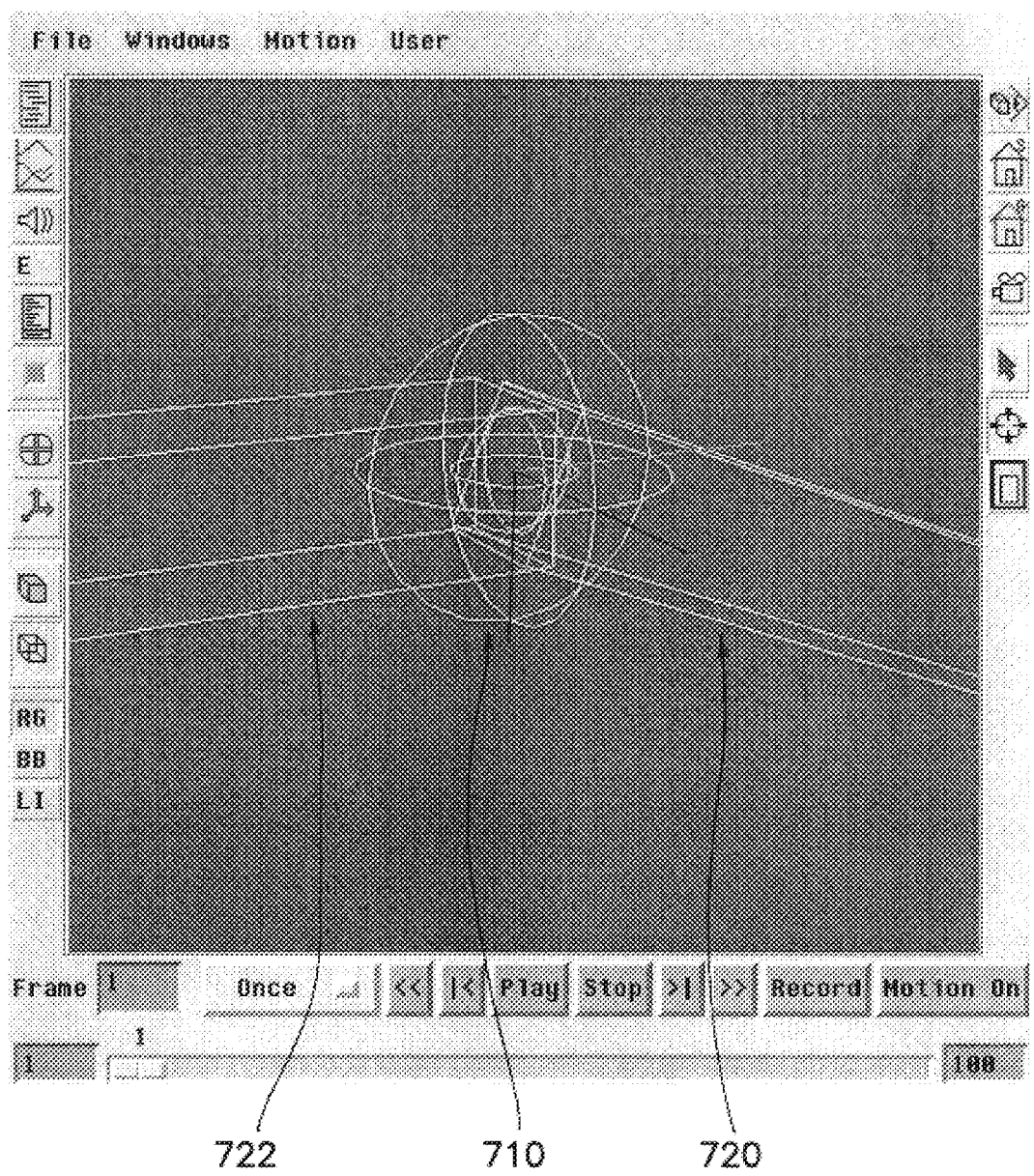
FIG. 7 is an example of a MotionViewer display of an intersection of two segments.

A site is that part of a node associated with whichever of two segments intersecting at the node is closer to the root. As an example, using the structure shown in FIG. 2 as the scene character structure, 'segment1.base' 604 is the root object and is used as the translation point between the geography and motion capture hierarchies. MotionViewer 101 displays sites as larger cubes in order to make them easier to identify and select with the mouse. FIG. 7 shows an example of one such site 710, which is at the intersection of segments 722 and 720. Site 710 is associated with segment 720 because segment 720 is closer to the skeleton root than segment 722.

Figure 8:
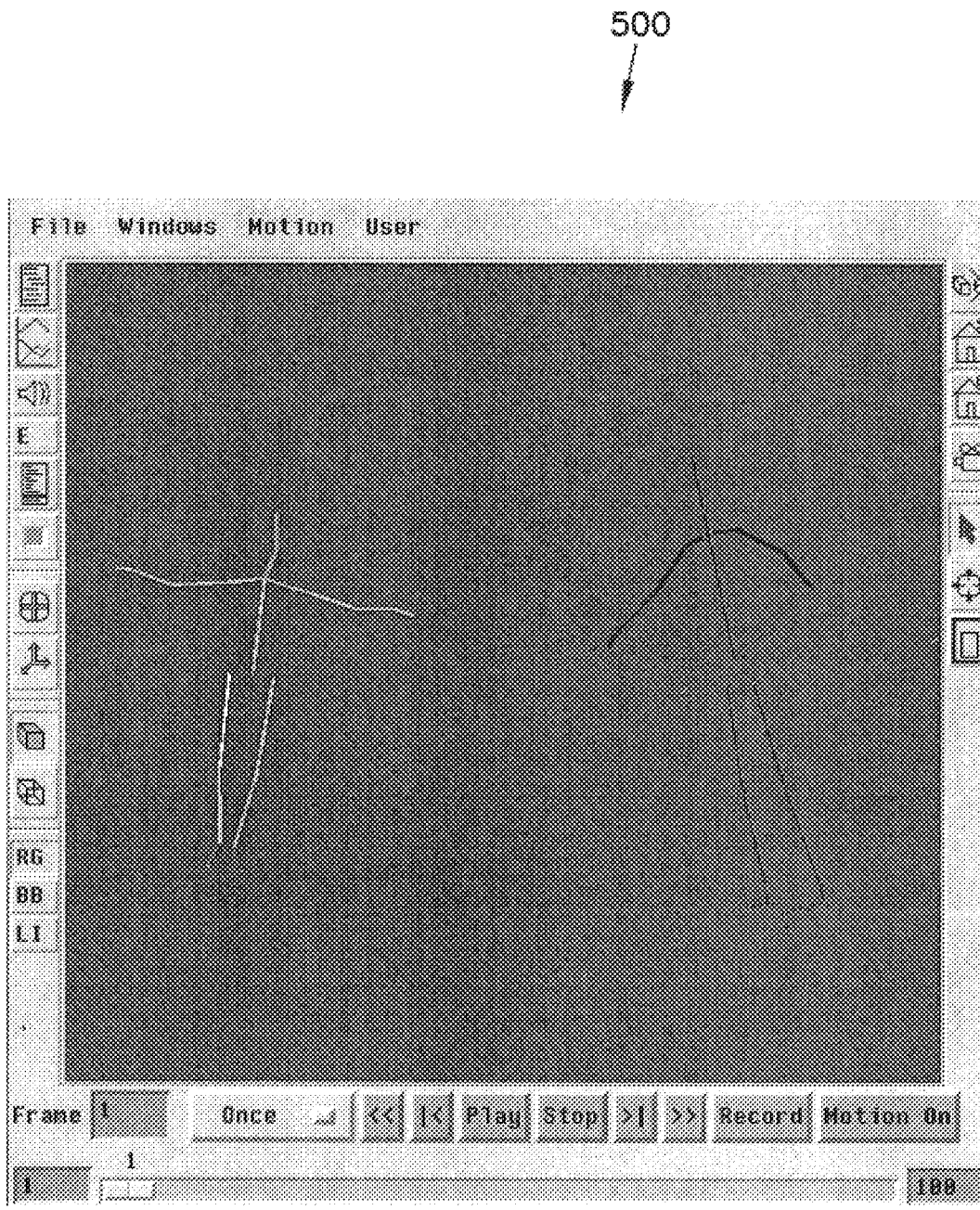
FIG. 8 is an example of a MotionViewer display of a scene character and an EVa character.
Figure 9:
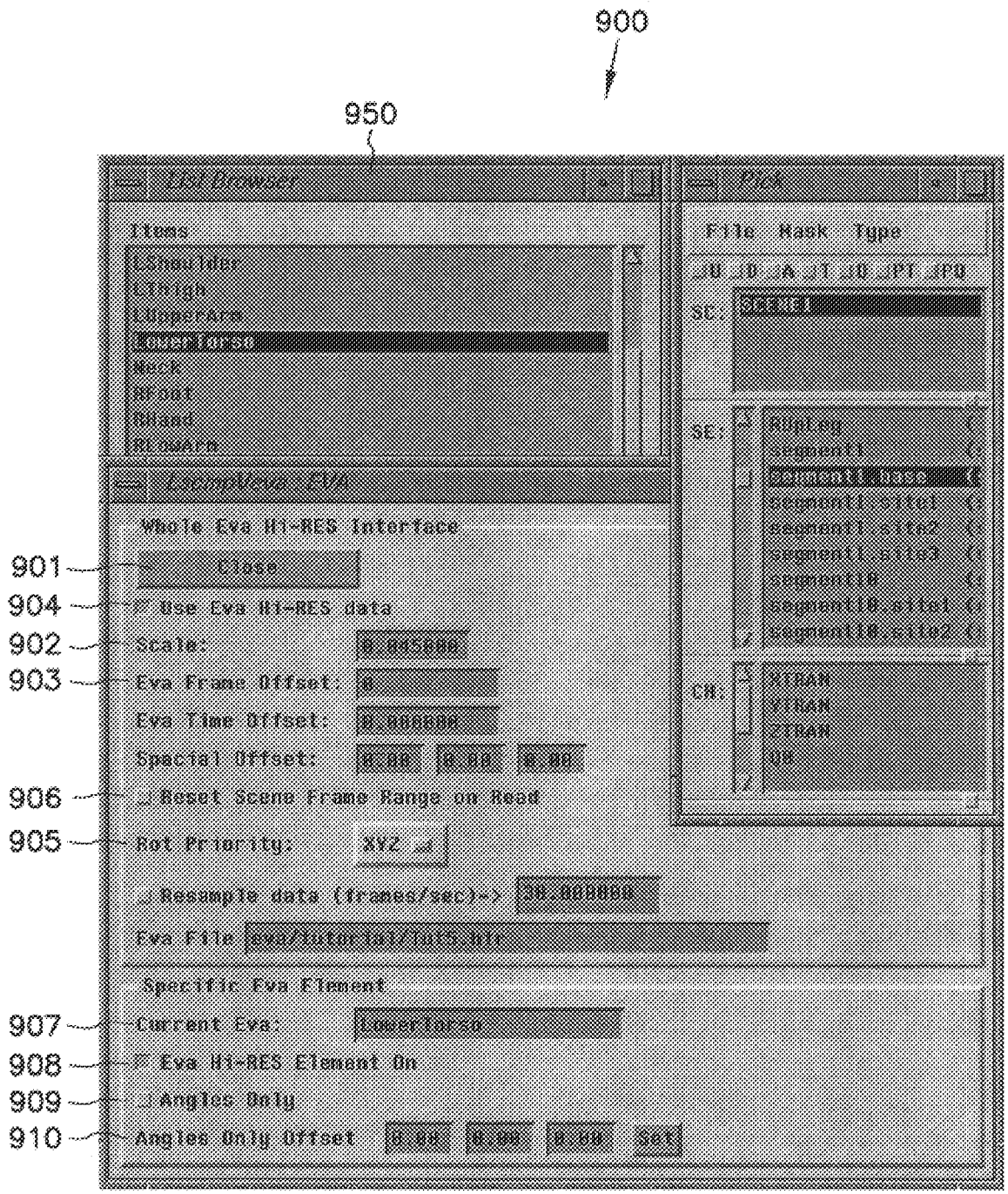
FIG. 9 is an example of the window presented by the EVa interface.

Next, the users loads the EVa skeletal segment data representing the skeletal segments of the motion capture data into MotionViewer 101 by keying the command "<just_bones.scn" into the message window. The message window is displayed separately from the main display window, and may be activated by either selecting the message option from the File menu 501 or by selecting the message button 502. At this point both the motion capture skeleton and the scene character skeleton are displayed in the main window as shown in FIG. 8. The user may change the color of one or the other displayed skeletons in order to better distinguish them. The user next initiates the EVa motion interface (LSCMPEVa) 900, shown in FIG. 9, by selecting the "EVa" option available under the "Motion" menu 501. A scale factor is built into the newer EVa .htr files but there is also a "Scale" option which allows the user to scale the motion capture skeleton to more closely match the scene character skeleton.

The next step, not heretofore incorporated in a graphic scene editor, is to graphically calibrate the scene character skeleton. Each site to which motion data will be applied must be calibrated. Conventional methods created a matrix for each structure and then correlated the structures by mathematically adjusting the motion capture matrix as a whole for each point in time included in the scene. In comparison, the system of the invention correlates each site in the character hierarchy to a corresponding site in the motion data hierarchy at one point in time. The resulting information is then used to transform each site at any point in time. Once the transformation data is created it can be used to apply any motion capture data set, so long as it has the same underlying hierarchy, to that character hierarchy. Conventional systems must regenerate the transformation information for each set of motion capture data.

In the system of the invention, the user starts by selecting a site to calibrate by either typing the name directly into the text input area or selecting the name from the browser which is brought up by double clicking on the text input area. The browser lists all of the EVa segment names in the database. The order of calibration is not significant, and the user may go back and recalibrate a site without affecting the calibration of other sites. A "calibration" consists of two elements. The first element is the motion capture segment from which motion data will be obtained. The second element is the orientation offset of the scene element from the motion capture segment. The user has complete control over which motion capture node is correlated to each scene character node. It is not important as to whether both frameworks have the same number of nodes. For example, if the scene character has no knee node, just a hip and a foot node, the scene character's hip and foot node are associated with the MotionViewer's hip and foot node, respectively. The MotionViewer character's knee node is disregarded. In the EVa interface the text input area labeled "Current EVa" shows what the current scene element is attached to.

Figure 10:
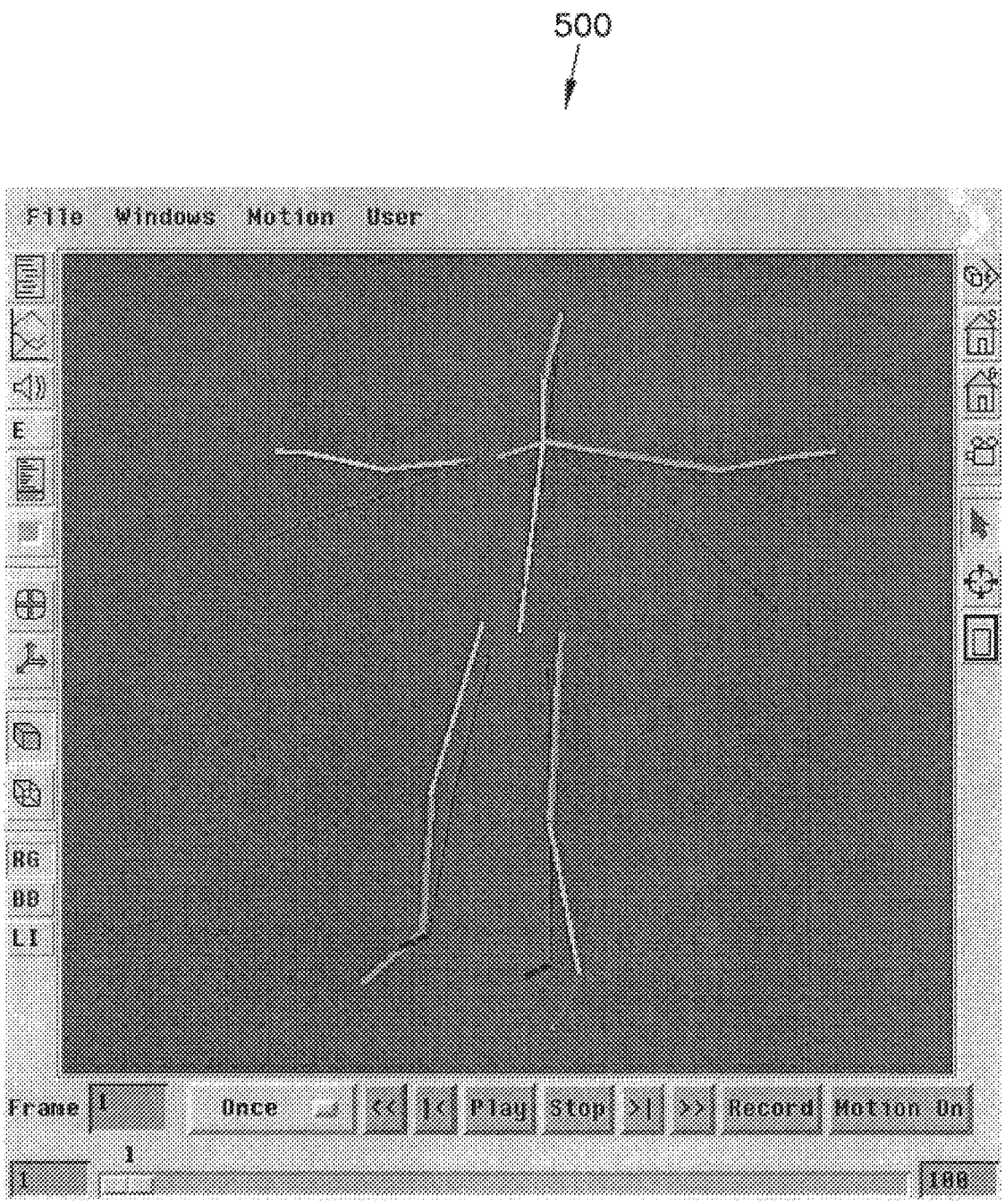
FIG. 10 is an example of a MotionViewer display of a scene character overlaid with an EVa character.

Generally the user will first animate the root of the scene character skeleton. For the sake of this example the structures shown in FIGS. 2 and 3 represent, respectively, the scene character and motion capture skeleton structures. To calibrate the root the user goes to the Picker window and picks "segment1.base" from the scene character skeleton, and in the EVa interface picks "lower torso" from the motion capture skeleton. When calibrating the root segment the "Angles Only" flag is toggled "off", and when calibrating the other segments it is toggled on. This is because the root segment calibration identifies the actual relationship between the two frameworks in terms of global coordinates. The calibration of the remaining scene character segments is a modification of their translation, rotation, and scaling relative to the scene character root segment, the modification determined by the position of the corresponding motion capture segment relative to the motion capture root segment. Describing the relationship between segments as a motion hierarchy instead of the conventional dual-matrix relationship reduces the number of data manipulation steps required and allows the motion capture data to be applied directly to the scene character. On completion of the root segment calibration the scene character skeleton is superimposed over the motion capture skeleton as shown in FIG. 10.

To process each of the remaining segments, in the display the user selects the next segment to be calibrated with the right mouse button, which places the image of a trackball around the selected scene character segment 650 (FIG. 6) and puts the scene character segment's name in the Picker window 651. In the EVa interface window 900 (FIG. 9) the user toggles "Angles Only" 909 on and sets the "Current EVa" 907 value to the motion capture segment to which the scene character segment in the Picker window is to be calibrated. If the EVa and scene segments are not already aligned, the user manipulates the scene element into position using the Channel Grapher 114 in conjunction with the trackball. The Channel Grapher 114 measures how the segment's position changes from its initial position relative to the scene character root segment. The numbers displayed in the "Angles Only Offset" display 910 represent the rotation values indicating the difference in orientation between the two elements. The user then selects the "Set" button in the EVa interface which stores the angles only offset values in memory. This stores the calibration information for the current segment in memory. The user can now calibrate the next site. At any point the user can select "Motion On" 521 in the MotionViewer window 500 to see how the motion data is applied to the scene skeleton. After each viewing the user must select "Stop" 519 before proceeding.

The calibration process is repeated for every node in the scene character. By driving the calibration process from the scene character the animation is built upon the motion hierarchy established by the user, and the motion capture data is applied to that hierarchy rather than defining the hierarchy. After all sites have been calibrated the motion data can be exported to Kinemation. All calibration data is stored in memory during the calibration process in order to maximize resource efficient. Prior to export the data in the LSCMP database 150 must be updated with the calibration data stored by the EVa and Channel Grapher 114 interfaces in memory. This is done by selecting the "Record" button 520 in the main window after all calibration is completed.

Record 520 causes the contents of the in-memory database to be written to a file. The application interface essentially deconstructs the database into a file containing data and LSCMP commands. When the scene(s) represented by that data is initialized in the system of the invention, the file is executed, recreating the database in the computer's memory. The record process incorporates an application programming interface (API) (not shown) to write to the file, in addition to the three-dimensional object data, the commands necessary to recreate the working environment, establish the character framework, and associate the relevant motion data. Each time a session is initiated, the record file is processed through the same API and the database is recreated in memory. As a result, once the database is initiated all input/output activity involves only the memory. This provides better overall performance as well as concurrent access by multiple processes to current ("live") data. For example, any site may be recalibrated after the data has been written to the database. The change is instantly recognized by any access to that portion of the scene. If the changed site information is not saved (by selecting the "Record" button 520) then the change will not be in effect the next time the motion data is activated. If the element or scene is saved after the change is made then the change is permanent. A command script for exporting and importing the motion data is created by the MotionViewer 101 when the user executes the "Read_bod" command. The command scripts provide a reliable and repeatable method of moving the animation data from the database into an animation application.

The calibration process previously described comprises a transformation calculated for each site or transformation node of the character for a particular point in time. The formula for calculating the transformation is as follows:

$$\underline{M} = \underline{M}_{MC} * \underline{M}_{AO} * \underline{M}^{-1}_{parent} \qquad \text{Equation 1}$$

where $\underline{M}$ is the transformation of a node in the character.

$\underline{M}_{MC}$ is the global transform of the corresponding node in the motion capture hierarchy.

$\underline{M}_{AO}$ is the transform describing the difference between the nodes of the two hierarchies.

$\underline{M}^{-1}_{parent}$ is the global transform of the parent node of $\underline{M}$ in the character.

Once $\underline{M}$ is calculated for one point in time it can be used to "map" (correlate) the motion capture data onto the character for any point in time.

The transformation data for a node is stored in the database in parts. Whenever a transformation is calculated (such as $\underline{M}$ in Equation 1), it must be broken into its three parts for storage. The three parts are translation, rotation, and scaling, stored in channels within the node's respective object which is stored in the LSCMP database 150. Translation and scaling are always continuous and are represented in the standard form of a translation and scale value for each of the three dimensions X, Y, and Z. Rotation, on the other hand, can be represented in a number of ways. Conventional systems allow for only one type of rotation representation, referred to as Euler's angles. The system of the invention supports Euler's angles as well as a second representation, called quaternions.

The Euler's angles representation expresses a complete rotation as a series of three rotations about each three dimensional space axis (X, Y, and Z). First a rotation is applied about one axis, the result is then rotated about a second axis, and then the last rotation is applied. This technique suffers from a number of problems, including interpolation. Since the same rotation can be represented in a number of different ways (for example, a 180 degree rotation about Y can also be expressed by a combination of a 180 degree rotation about X and a 180 degree rotation about Z), a linear traversal between two sets of Euler's rotations can lead to errors or, at least, some very non-intuitive results. This representation poses a problem for applications which do automatic recalculation of motion data. The MotionViewer 101 includes the logic necessary to handle this sort of data, however. Euler's angles are preferable in certain instances, however. For example, a rotation of 30 degrees about the X axis is easy to understand, and if that is the only rotation required then Euler's angles is the easiest way to specify it.

A quaternion, on the other hand, uses four values to represent motion. Sometimes the values are called x, y, z, w and sometimes (as in the MotionViewer 101) they are called Q0, Q1, Q2, and Q3. Simply stated, the first three numbers are the axis of rotation, and the fourth number is the amount of rotation around that axis. It's a little trickier than that, however, because the amount of rotation is not expressed in angles or degrees, it is expressed in the cosine of the angle. The system of the invention allows users to select the motion representation that best fits the type of operation they wish to perform. Quaternions are better suited for filtering and key framing orientation information. Euler's angles provide a more intuitive interpretation of motion data. When the rotation data is stored the user must select the rotation representation to be applied. At any time the user may switch the representation used for rotation. The conversion of data is done by first creating a transformation from the rotation data and then using the transformation to extract the data in the form of the other type of rotation. The conversion changes the internal format stored in memory, but the change is not permanent unless the user saves the scene after the change is made.

Note that the transformation need only be done for one position or one point in time. Once the angles only offset has been determined for each site in the scene skeleton in a particular position, the offsets can be applied to the motion data at any point in time to determine the proper position for the scene character. Once all the transformations are completed and the angles only offsets have been calculated, the motion capture data and offsets for each site are stored in the LSCMP database 150. A user then selects an application to display or edit the motion data. Because the data is stored in a modular structure which is independent of application-specific display mechanisms, each application may choose how it wishes to display LSCMP data. The LSCMP database 150 provides the animation data and pointers to the structural data held in Lgeom 155, and the application is responsible for converting the LSCMP data into graphics commands for creating a visual representation of the animation data.

LSCMPLgeom 120 provides the software tools for applying the time varying changes represented by the motion capture data in the LSCMP database to the geometry data stored in Lgeom. MotionViewer 101 then serves in conjunction with LSCMPLgeom 120 as an interface to applications which operate on or with motion data. Since MotionViewer 101 is an integrated application it allows a user to view the data interactively with a low quality three-dimensional rendering mechanism while also allowing the user to do high quality rendering, thereby saving the user time. The primary source of time savings is due to the fact that the all of the work is done in the computer's memory and the amount of input/output to a disk is kept to a minimum. Integrating the applications through use of a common interface and data store also reduces errors. Many files have to be coordinated to create high quality three-dimensional images. Since all of the data is kept in memory, there is no need to make sure all of the files are up to date during the processing and the user is less likely to use out-of-date information.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of managing animation data on a computer, the computer comprising a memory and a display the method comprising the steps of:

storing motion data in a database in the computer's memory, the motion data comprising a hierarchy of segments and nodes;

storing geometry data in a computer-readable file, the geometry data comprising a hierarchy of segments and nodes:

graphically editing the motion data:

combining the motion data and the geometry data to create a computer-readable file of three-dimensional animation data transforming the motion data hierarchy to align with the geometry data hierarchy, further comprising creating a transformation for each node in the geometry data hierarchy;

storing the transformation for each node in the database; and applying the motion data to the geometry data by transforming each node of the motion data hierarchy according to the respective transformation stored in the database.

* * * * *